United States Patent [19]
Thomas et al.

[11] Patent Number: 5,206,790
[45] Date of Patent: Apr. 27, 1993

[54] PIVOT AND SWIVEL MECHANISM FOR LAP TOP DISPLAY

[75] Inventors: William B. Thomas, Fremont; Michael R. Barry; James R. Flom, both of Palo Alto, all of Calif.

[73] Assignee: Zeos International, Ltd., St. Paul, Minn.

[21] Appl. No.: 728,570

[22] Filed: Jul. 11, 1991

[51] Int. Cl.⁵ .......................... H05K 7/16; G06F 1/16; E05D 11/08
[52] U.S. Cl. ..................... 361/380; 16/342; 16/367
[58] Field of Search ............... 364/708; 248/278, 917, 248/918, 919, 920, 921, 922, 923; 16/115, 119, 282, 285, 280, 337, 342, 366, 367, 371; 361/380, 392, 395, 399

[56] References Cited

U.S. PATENT DOCUMENTS

| | | | |
|---|---|---|---|
| 2,337,561 | 12/1943 | Lofgren | 16/115 |
| 4,134,480 | 1/1979 | Davis | 16/115 |
| 4,834,329 | 5/1989 | Delapp | 248/923 X |
| 4,903,222 | 2/1990 | Carter et al. | 364/708 |
| 4,926,365 | 5/1990 | Hsieh | 364/708 |
| 4,960,256 | 10/1990 | Chihara et al. | 16/366 X |
| 4,976,007 | 12/1990 | Lanz | 16/342 X |
| 5,016,849 | 5/1991 | Wu | 248/278 X |
| 5,018,244 | 5/1991 | Hino | 16/337 X |
| 5,028,913 | 7/1991 | Kitamura | 248/919 X |
| 5,030,128 | 7/1991 | Herron et al. | 364/708 X |
| 5,075,929 | 12/1991 | Chung | 16/337 X |
| 5,077,551 | 12/1991 | Saitou | 364/708 X |
| 5,125,610 | 6/1992 | Queau | 248/921 X |
| 5,126,725 | 6/1992 | Yanagisawa | 364/708 X |

*Primary Examiner*—Leo P. Picard
*Assistant Examiner*—Michael W. Phillips
*Attorney, Agent, or Firm*—Flehr, Hohbach, Test, Albritton & Herbert

[57] ABSTRACT

A laptop computer (10) with a tiltable and swivelable display (12) is connected to case (29) by a pivot mechanism (20) and a swivel mechanism (33). In the pivot mechanism (20), a first pivot (22) connects display (12) to a pivot plate (50), and the second pivot (24) connects the pivot plate (50) to base (32) of the display (12). The first pivot (22) consists of a pair of pivot pins (52) on each end of the pivot plate (50). The second pivot (24) consists of split pivot pins (54) at each end of the pivot plate (50). The pivot pins (54) and inboard shafts (58) are fastened together and inboard shafts (58) rotate within outboard shafts (56). The outboard shafts (56) and the inboard shafts (58) are surrounded by clutch springs (60), which are connected so that the clutches are in their free rotating direction, i.e., does not resist motion between them when the display is being opened, and which resist motion between the inboard shafts (58) and outboard shafts (56) when the display is being lowered, to produce a greater friction than produced by the first pivot (22). The swivel mechanism (33) consists of a first swivel member (70) fixedly attached to case (29) and a second swivel member (72) which is fixedly attached to display base (32) and nests inside the first swivel member (70). The second swivel member (72) rotates inside the first swivel member (70).

14 Claims, 6 Drawing Sheets

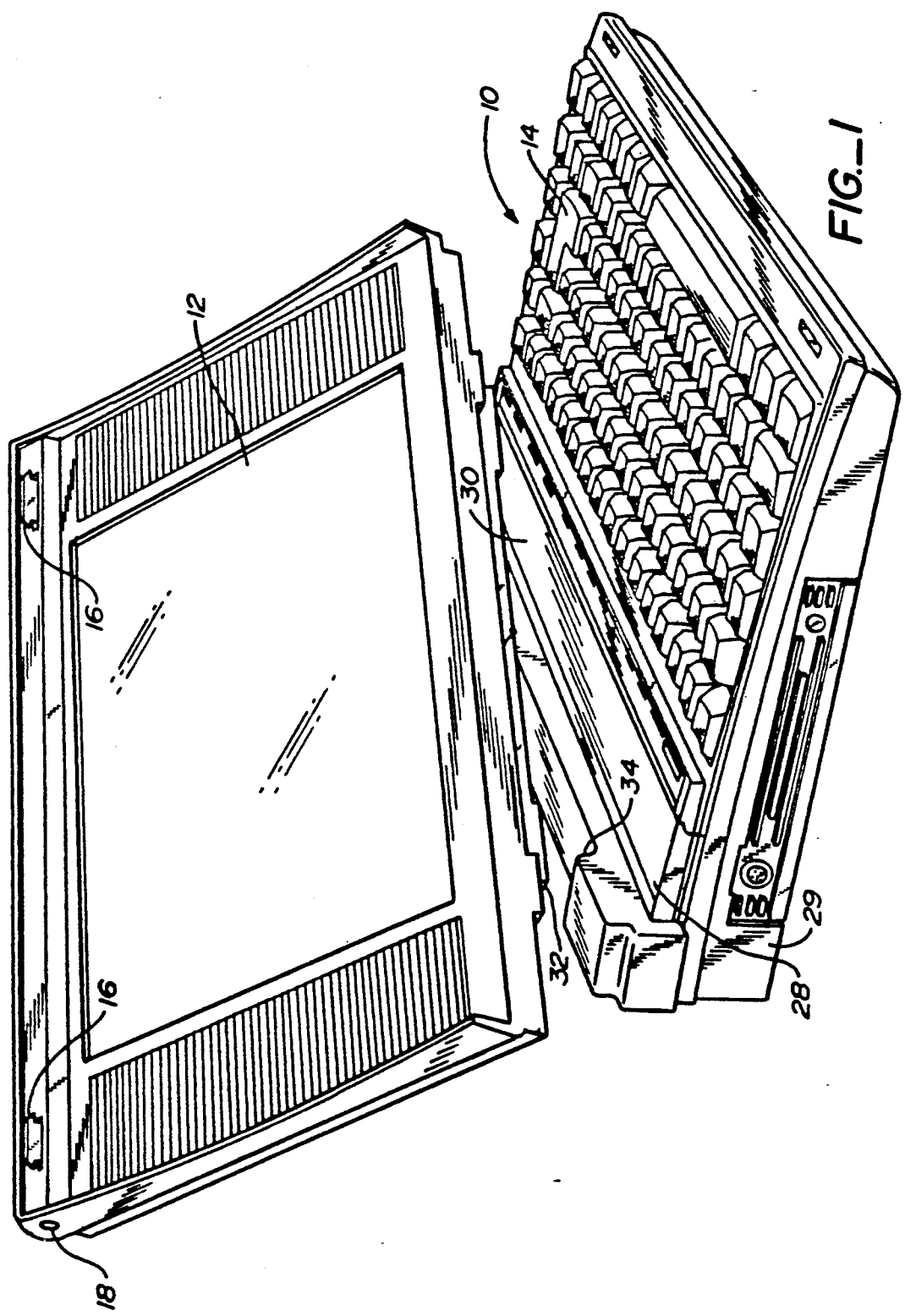
FIG._1

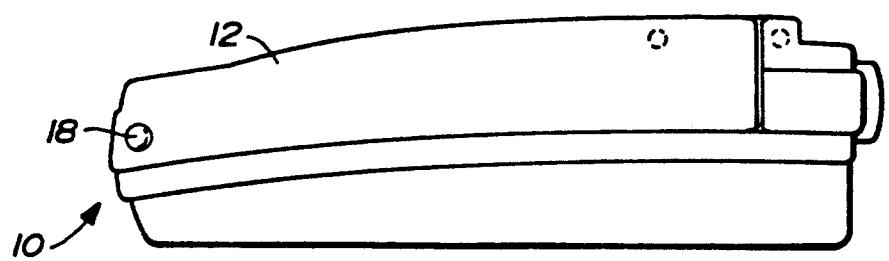
FIG._2A
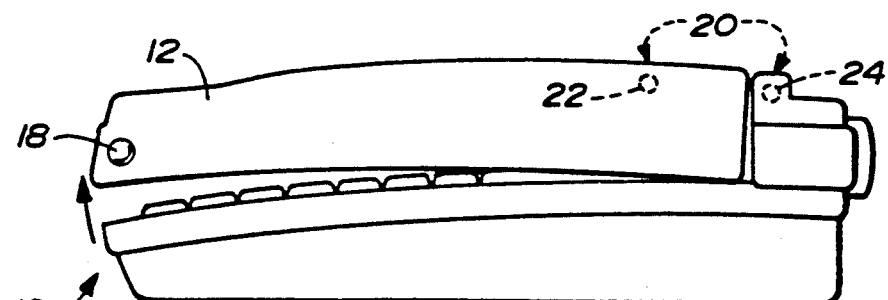
FIG._2B
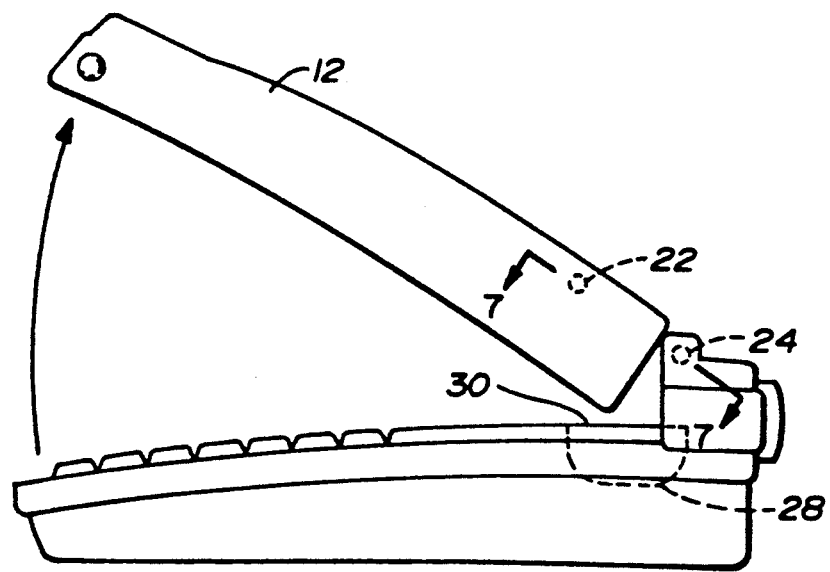
FIG._2C

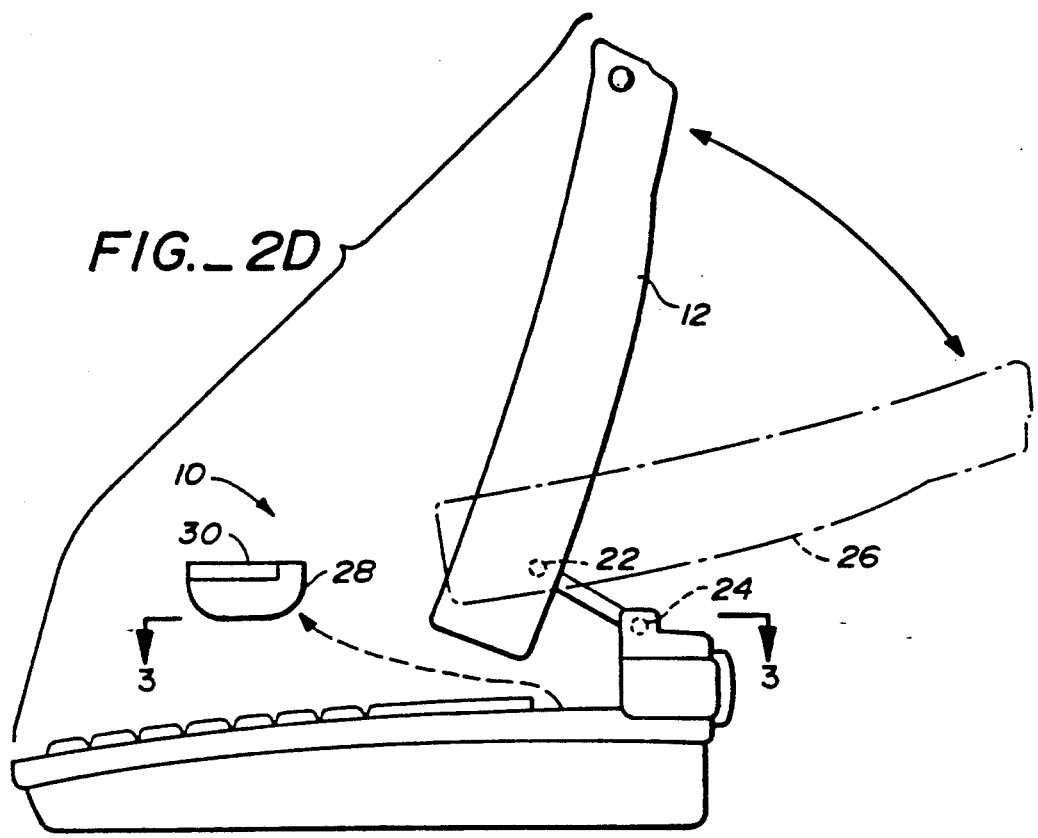
FIG._2D
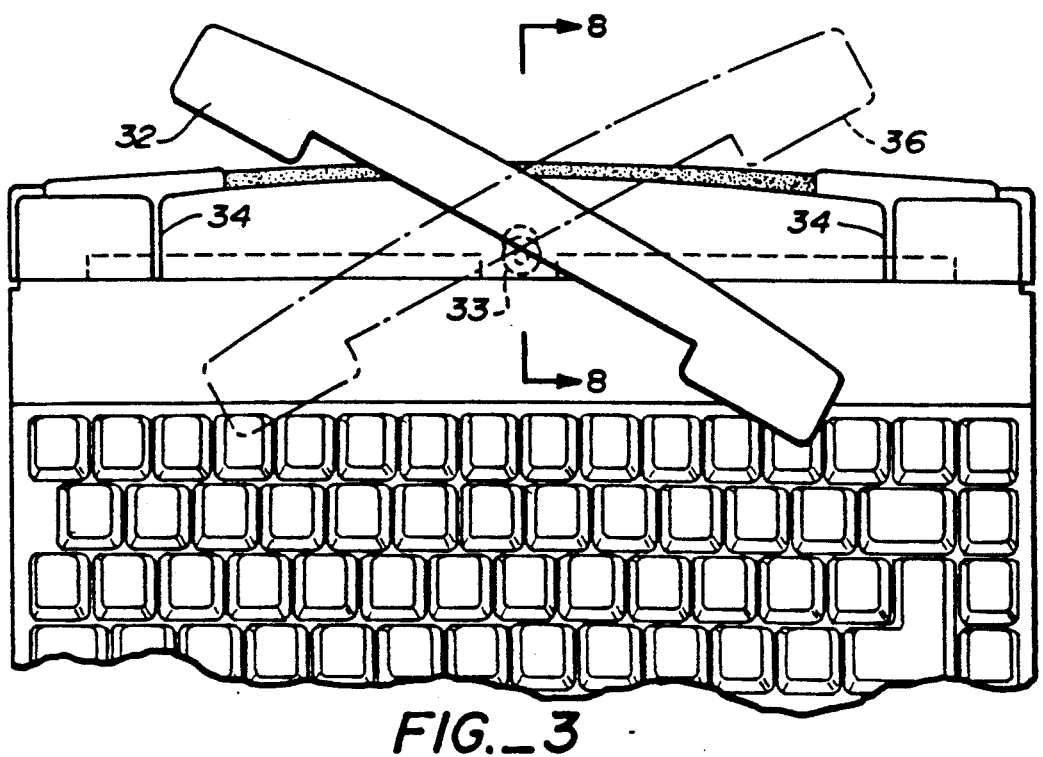
FIG._3

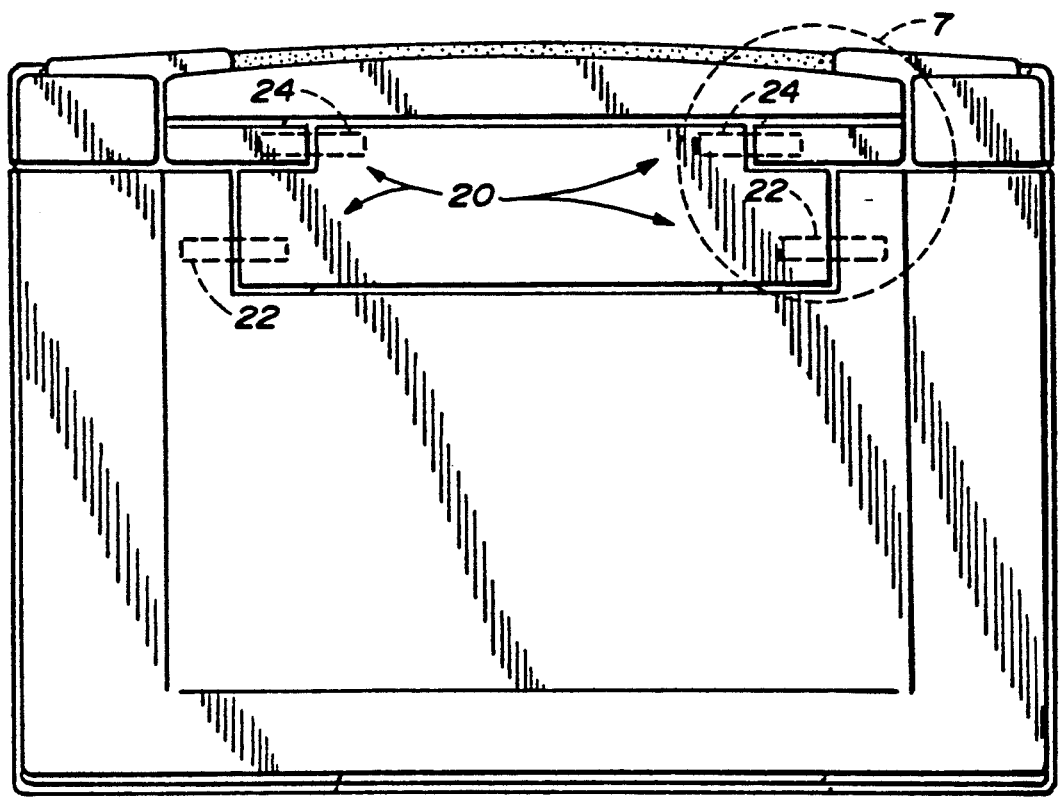
FIG._6
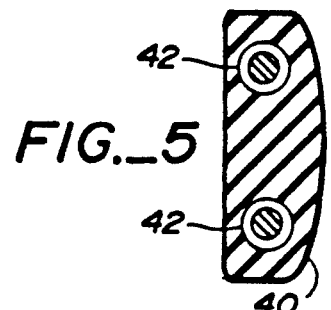
FIG._5
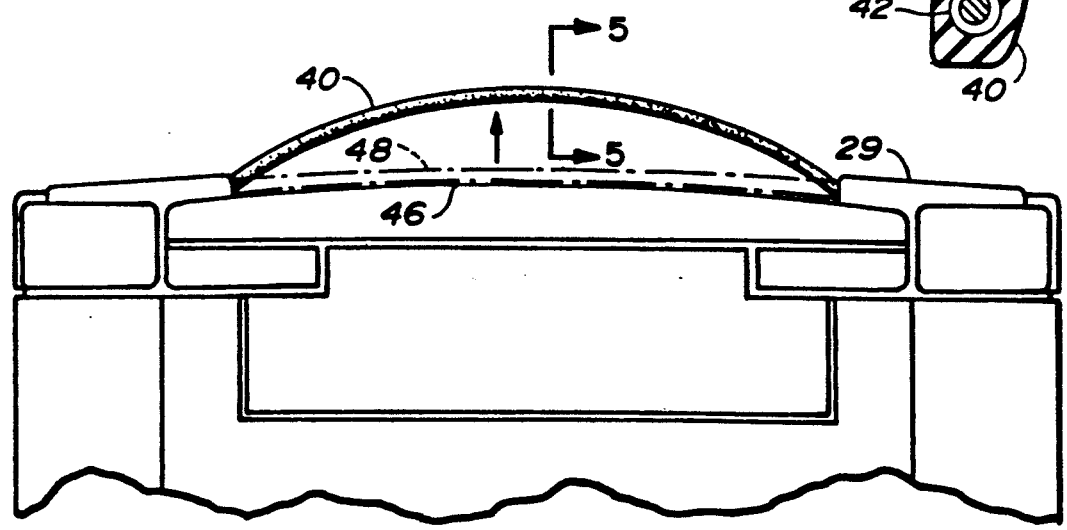
FIG._4

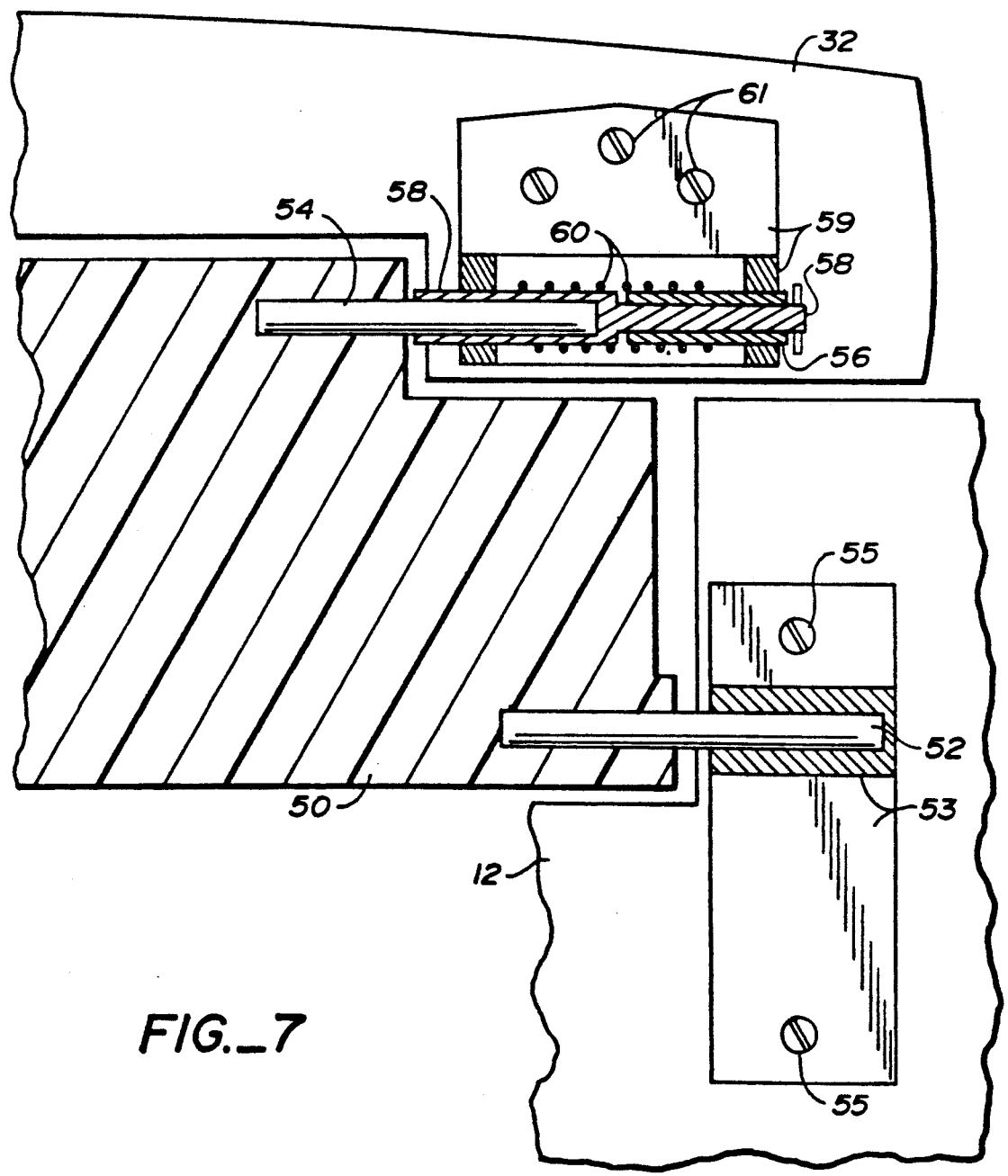
FIG._7

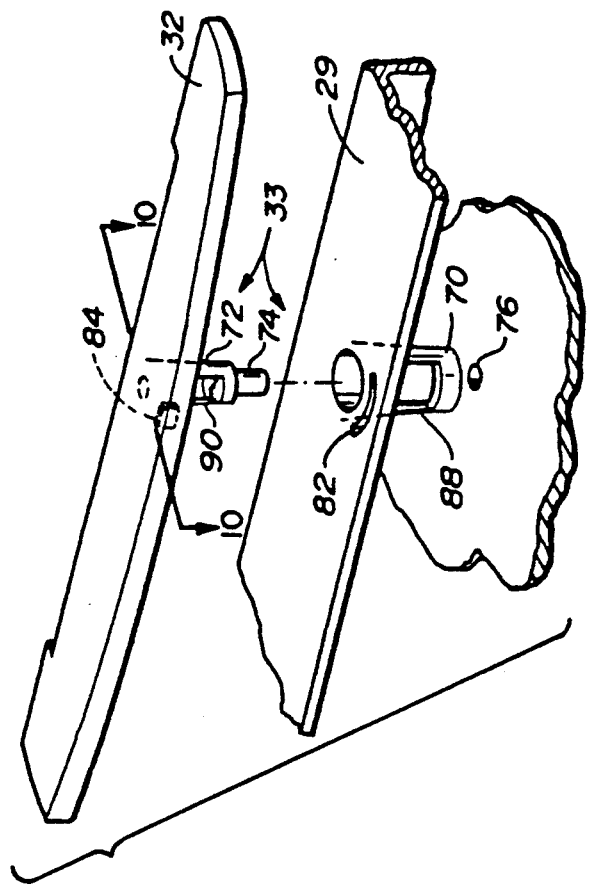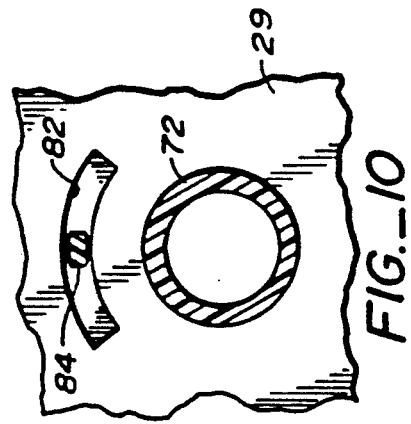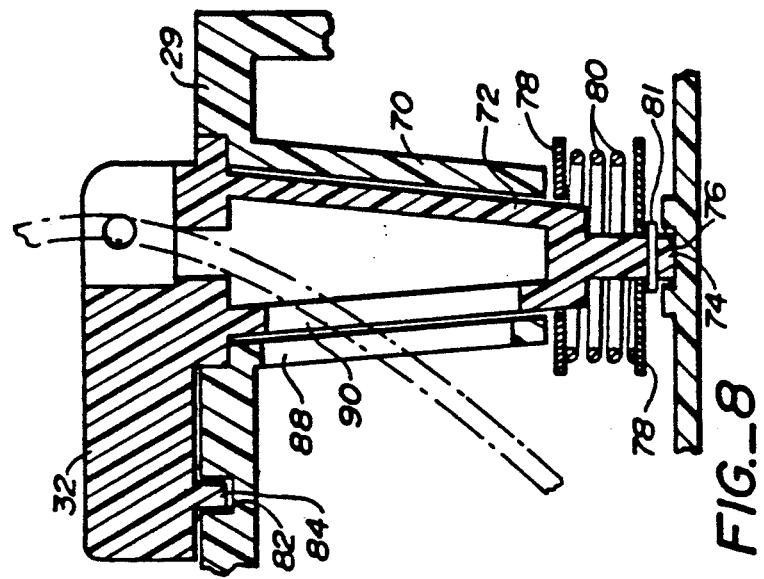

PIVOT AND SWIVEL MECHANISM FOR LAP TOP DISPLAY

BACKGROUND OF THE INVENTION

1. Field of the Invention

The present invention pertains to a laptop computer with a swivel display or a notebook computer with a swivel display. It further relates to such a laptop or notebook computer incorporating an improved pivot mechanism for the display. It especially relates to such a laptop or notebook computer incorporating both the improved pivot mechanism and the swivel display.

2. Description of the Prior Art

Prior art laptop computers or notebook computers have not provided a display which swivels. The prior art displays have only tilted with respect to the keyboard. While the tilting of a computer display has been acceptable, it has not always been appropriate in that it is sometimes desirous to reposition the display with respect to the keyboard, especially if there are others besides the person who is using the keyboard who desire to view the display.

Prior art laptop or notebook computers further have displays which tilt or pivot about a single pivot axis to raise the display from its stowed position over the keyboard to its raised position for viewing while using the computer. As a practical matter, this construction has limited the angle to which the display can be raised in use of the computer. As a result, the display of prior art laptop of notebook computers cannot be positioned at an optimum angle for use of the computer while actually resting on the lap of the user.

The present invention overcomes the disadvantages of the prior art by providing a swivelable, as well as tiltable display, allowing for more freedom of movement of the display with respect to the keyboard. The invention further allows the display to be positioned at an optimum angle for viewing with the computer resting on the lap of the user.

SUMMARY OF THE INVENTION

It is an object of this invention to provide a swivelable, tiltable display for a laptop computer or a notebook computer.

It is another object of the invention to provide a laptop or notebook computer including an improved pivot mechanism for the display of the laptop or notebook computer that will allow the display to be tilted or pivoted to an optimum angle with respect to the keyboard for use of the computer while it rests on the lap of the user.

It is a further object of the invention to provide such a laptop or notebook computer which will allow the display to be positioned for viewing by another person besides the person using the keyboard.

It is a still another object of the invention to provide such a laptop or notebook computer which will allow movement of the display about two axes at an angle with respect to one another.

According to one embodiment of the present invention, there is provided a laptop computer or notebook computer with a swivel about a first axis, as well as a pivot about a second axis, which engage the top of the housing and support a display for horizontal movement about the swivel and for vertical movement about the pivot, thereby providing both swiveling and pivoting movement with respect to the keyboard.

Significant aspects and features of the present invention include a laptop computer or notebook computer with a display which swivels, as well as tilts, with respect to the keyboard. This is very advantageous when another party decides to view the display, as well as when the position of the computer system may render the position of a fixed display in a less than desirable viewing position. The screen can be swiveled for optimal viewing angle.

A laptop or notebook computer in accordance with the invention has a case, a mother board and a keyboard in the case. A display for the computer has a means for swivel mounting the display on the case connected between the display and the case. A means for pivotably mounting the display on the case is connected between the display and the case.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 illustrates a perspective view of a notebook computer or a laptop computer with a tiltable display, as well as a swivel display, with the display in its extreme tilted and swiveled positions.

FIGS. 2A-2D are sequential side views illustrating the computer of FIG. 1 with the display closed over the keyboard, with catches released, preparatory to raising the display to the open position, with the display partly raised to its open position, and with the display fully tilted to raise it to its open position for operation of the computer.

FIG. 3 is a top view of the computer of FIGS. 1-2D, from the point of view of line 3—3 in FIG. 2D, showing the extent of swiveling of the display that can take place.

FIG. 4 is a top view of the computer of FIGS. 1-3, with the display in its closed position and with the handle extended.

FIG. 5 is a cross-section view, taken along the line 5-5 in FIG. 4.

FIG. 6 is a top view of the computer of FIGS. 1-3.

FIG. 7 is a cross-section view, taken along the line 7—7 in FIG. 2C, and representing area 7 in FIG. 6.

FIG. 8 is a cross-section view, taken along the line 8—8 in FIG. 3.

FIG. 9 is an exploded perspective view of a portion of the computer of FIGS. 1-4.

FIG. 10 is a cross section view, taken along the line 10—10 in FIG. 9.

DESCRIPTION OF THE PREFERRED EMBODIMENT

Turning now to the drawings, more particularly to FIG. 1, there is shown a laptop computer 10 with a tiltable and swivelable display 12. As shown, the display 12 has both been tilted upward from its closed position (see FIG. 2A) over keyboard 14 to its maximum extent, so that the display 12 makes a shallow angle with the horizontal. Such a position is most useful when using the computer while it is resting on the user's lap, because it positions the display 12 at the best angle for viewing from the user's lap. Previous laptop computers did not allow the display to be tilted back to such a great extent, and their displays were thus not at an optimum angle for viewing with the computer on the user's lap. The display 12 is also shown swiveled to the side the maximum extent possible. Such a swiveled position is useful for showing material on the display 12 to a person beside the user. No previous laptop computer is capable of positioning its display in such a swiveled position relative to the keyboard 14.

FIGS. 2A-2D show the sequence of operations when the computer 10 is opened, and the display 12 is raised to its use positions. In FIG. 2A, the display is held in position by latches 16 (FIG. 1) on each side of the display. Buttons 18 are used to release the latches 16, and the display 12 then assumes an ajar position shown in FIG. 2A, as a result of spring force produced by the construction of pivot mechanism 20, consisting of pivots 22 and 24, for the display 12, which will be explained below in connection with FIG. 6. Having the display 12 assume such an ajar position when the latches 16 are released represents a significant convenience for the user when opening the computer 10.

In FIG. 2C, the display 12 pivots on pivot 24 of the pivot mechanism 20 until it reaches the position shown in FIG. 2C. The pivot 22 of the pivot mechanism has greater resistance to pivoting in the opening direction than the pivot 24. When the pivot 24 reaches its maximum extent of pivoting motion in the opening direction, as determined by a stop, the display 12 begins to pivot on the pivot 22, to reach the position shown in FIG. 2D. With the display 12 raised to this position, the computer 10 is positioned for use on a desk, airplane tray table or similar support in front of the user. However, if the computer 10 is placed on the user's lap, the display 12 is not at the proper angle for optimum viewing by the user. The presence of the first pivot 22 allows the display 12 to be pivoted further back, to the position shown in phantom at 26 in FIG. 2D, so that the display 12 is positioned at the proper angle for optimum viewing in the user's lap.

Also shown in FIGS. 1, 2C and 2D is the construction of battery module 28 for the computer 10. Top surface 30 of the battery module 28 also forms the top surface of the case behind the keyboard 14 of the computer 10. As shown, the battery module 28 extends above the rest of case 29 substantially the same extent as the keys of the keyboard 14. As a result, the battery module 28 occupies less of the internal space of the case 29 than a conventional battery module. When the display 12 is in the position indicated at 26 in FIG. 2D, the battery module 28 is easily removed for replacement with a spare battery module 28. The battery module 28 is held in place behind the keyboard 14 by suitable detents (not shown).

FIGS. 1 and 3 show the two maximum swivel positions for the display 12. Base 32 of the display 12 is mounted on a swivel 33 and fits into slot 34 on the case 29 when the display 12 is oriented in its straight ahead position. When the display 12 is swiveled to the left and right, the base 32 of the display 12 assumes the position shown in FIG. 3 and the position indicated in phantom at 36, respectively.

FIGS. 4 and 5 show the construction of an elastomeric handle 40 for the computer 10. The handle 40 consists of an elastomeric body having a pair of apertures 42 extending through its length. A metal or fiber cable 44 is looped through the apertures 42 and secured to the case 29 to fasten the handle 40 to the case at both ends. When the handle 40 is not in use, it rests unobtrusively against the back 46 of the case 29, as shown in phantom at 48. When the handle 40 is used to carry the computer 10, the elastomeric body of the handle 40 stretches to allow the handle 40 to move away from the back 46 of the case 29 for grasping. The presence of the metal or fiber cable 44 inside the handle 40 limits the extent to which the handle 40 will stretch, and provides strength to the handle 40.

FIGS. 6 and 7 show details of the pivot mechanism 20. The pivot 22 connects display 12 to a pivot plate 50, and the pivot 24 connects the pivot plate 50 to base 32 of the display 12. The pivot 22 consists of a pair of pivot pins 52 on each end of the pivot plate 50. The pivot pins 52 are hollow metal cylinders with a longitudinal split extending along their length, friction fit to receiving apertures in the pivot plate 50. Friction between the plastic material of the pivot plate 50 and the pivot pins 52 provides enough resistance to movement so that the display will remain in a position to which it is raised until the user applies sufficient force on the display to overcome the friction. The other end of the pivot pins 52 remains fixed in a metal support 53 mounted to the display 12 with screws at 55. The pivot plate 50 is injection molded from a Nylon 6/6 plastic with a 30 percent by weight carbon fiber fill. This combination of materials gives a desired balance of strength, wear resistance, friction with the plastic, and lubricity of the carbon fibers.

The pivot 24 consists of split pivot pins 54 at each end of the pivot plate 50. The pivot pins 54 are engaged by inboard shafts 58. A portion of the inboard shafts 58 rotates inside of outboard shafts 56. The outboard shafts 56 and the inboard shafts 58 are surrounded by clutch springs 60, which are connected so that the clutches are in their free rotating direction, i.e., does not resist motion between them when the display is being opened, so that the pivot 24 has less resistance to pivoting when the display is being moved in its opening direction, and which resists motion between the pivot pins 54 and outboard shafts 56 when the display is being lowered, to produce a greater friction than produced by the pivot 22. The outboard shafts 56 and the inboard shafts 58 are mounted on a metal support 59, which is attached to the base 32 of the display 12 by screws at 61. When the display 12 is being lowered, spring 60 tightens around the inboard shaft 58 and the outboard shaft 56 and forces rotation to occur between pivot pins 54 and pivot plate 50. The frictional force of pivot 24 is greater than pivot 22. Consequently, the display 12 rotates about pivot 22 until it reaches a stop, then rotates about pivots 24 until it is fully lowered and latches 16 are engaged. When the display 12 is being opened, the spring 60 loosens around the inboard shaft 58 and the outboard shaft 56, so that the grip caused by the spring 60 is eliminated in that direction. This allows pivot 24 to rotate first when the display is being opened. When it reaches its predetermined stop, then pivot 22 rotates the display. The pivot pins 54 are also hollow metal cylinders with a longitudinal split along their length. Outboard shafts 56 and inboard shafts 58 are machined parts, with the inboard shafts 58 having an extension through the outboard shafts 56.

Details of the swivel mechanism 33 are shown in FIGS. 8-10. The swivel mechanism 33 consists of a first swivel member 70 fixedly attached to case 29 and a second swivel member 72 which is fixedly attached to display base 32 and nests inside the first swivel member 70. The second swivel member 72 rotates inside the first swivel member 70. The second swivel member 72 has a pin 74 which fits into hole 76 in the case 29. A pair of washers 78 separated by a spring 80 and held in place with a retaining ring 81 is positioned around the pin 74 to pull swivel member 72 onto swivel member 70. There is a sector-shaped slot 82 in the case 29 and a tab 84 on the display base which fits into the slot 82. As shown in FIG. 10, the tab 84 hits edges 86 of the slot 82 in order to limit the swivel travel of display base 32 to 30 degrees to the left and right of center. Openings 88 and 90 in the first swivel member 70 and the second swivel member 72 and hole 92 in display base 32 allow wire 94 to pass from the case 29 to the display 12 for electrical connection.

It should now be readily apparent to those skilled in the art that a novel pivot and swivel mechanism for a laptop computer and a laptop computer or a notebook computer incorporating the mechanism capable of achieving the stated objects of the invention has been provided. The invention provides a swivelable, tiltable display for a laptop computer or a notebook computer. The laptop or notebook computer including an improved pivot mechanism for the display of the laptop or notebook computer allows the display to be tilted or pivoted to an optimum angle with respect to the keyboard for use of the computer while it rests on the lap of the user. The laptop or notebook computer allows the display to be positioned for viewing by another person besides the person using the keyboard. The laptop or notebook computer allows movement of the display about two axes at an angle with respect to one another.

It should further be apparent to those skilled in the art that various changes in form and details of the invention as shown and described may be made. It is intended that such changes be included within the spirit and scope of the claims appended hereto.

What is claimed is:

1. A laptop or notebook computer comprising:
   a case;
   a mother board and a keyboard in said case;
   a display;
   means for swivel mounting said display on said case connected between said display and said case; and
   means for pivotably mounting said display on said case connected between said display and said case, said means for pivotably mounting said display on said case comprising a first pivot connected between said display and a pivot plate and a second pivot connected between said pivot plate and a base for said display, said first pivot having a greater resistance to pivoting in an opening direction of said display than said second pivot, said first pivot and said second pivot being axially displaced with respect to one another, so that said display and said pivot plate initially pivot together about said second pivot with respect to said case as said display is opened to a given extent, and said display then pivots with respect to said pivot plate about said first pivot when said display is opened a greater extent than the given extent, said second pivot having a greater resistance to pivoting than said first pivot when said display is lowered over said keyboard, so that said display initially pivots with respect to said pivot plate about said first pivot, and said display and said pivot plate then pivot together about said second pivot with respect to said case until said display is closed over said case.

2. The laptop or notebook computer of claim 1 in which said second pivot includes a clutch having a free rotating first direction and a second direction having resistance to rotation to produce the greater resistance to pivoting than said first pivot.

3. The laptop or notebook computer of claim 2 in which said clutch is a wrap spring clutch.

4. The laptop or notebook computer of claim 3 additionally comprising a latch means connected between said display and said case for fastening said display lowered over said keyboard, said spring clutch causing said display to move to an ajar position over said keyboard when said latch means is released.

5. The laptop or notebook computer of claim 1 in which said means for swivel mounting said display on said case comprises a first swivel member attached to said case and a second swivel member attached to said base for said display.

6. The laptop or notebook computer of claim 5 in which said first swivel member is fixedly attached to said case and said second swivel member is connected to rotate inside said first swivel member.

7. The laptop or notebook computer of claim 1 additionally comprising a handle attached to said case comprising an elastomeric body having a cable embedded in said elastomeric body, said cable being attached to said case.

8. The laptop or notebook computer of claim 1 additionally comprising a removable battery module in said case, said battery module having an upper surface forming part of an upper surface of said case and extending above a remainder of said case substantially a same extent as keys of said keyboard.

9. In a laptop or notebook computer having a base and a display which pivots between a closed position over said base and an open position, a pivot mechanism for said display of said laptop or notebook computer, which comprises a first pivot connected between said display and a pivot plate and a second pivot connected between said pivot plate and said base, said first pivot having a greater resistance to pivoting in an opening direction of said display than said second pivot, said first pivot and said second pivot being axially displaced with respect to one another, so that said display and said pivot plate initially pivot together about said second pivot with respect to said base as said display is opened to a given extent, and said display then pivots with respect to said pivot plate about said first pivot when said display is opened a greater extent than the given extent, said second pivot having a greater resistance to pivoting than said first pivot when said display is lowered over said base, so that said display initially pivots with respect to said pivot plate about said first pivot, and said display and said pivot plate than pivot together about said second pivot with respect to said base until said display is closed over said base.

10. The pivot mechanism for said display of said laptop or notebook computer of claim 9 in which said second pivot includes a clutch having a free rotating first direction and a second direction having resistance to rotation to produce the greater resistance to pivoting than said first pivot.

11. The pivot mechanism for said display of said laptop or notebook computer of claim 10 in which said clutch is a wrap spring clutch.

12. In combination in a laptop or notebook computer, the pivot mechanism for said display of said laptop or notebook computer of claim 9 and a swivel mechanism for said display of said laptop or notebook computer.

13. The combination of claim 12 in which said swivel mechanism comprises a first swivel member attached to said base of said computer and a second swivel member attached to a second base for said display.

14. The combination of claim 13 in which said first swivel member is fixedly attached to said base and said second swivel member is connected to rotate inside said first swivel member.

* * * * *